F. G. SARGENT.
METHOD OF AND APPARATUS FOR SELECTIVE WIRELESS TELEGRAPHY.
APPLICATION FILED OCT. 29, 1914.
Reissued Nov. 16, 1915. 14,012.
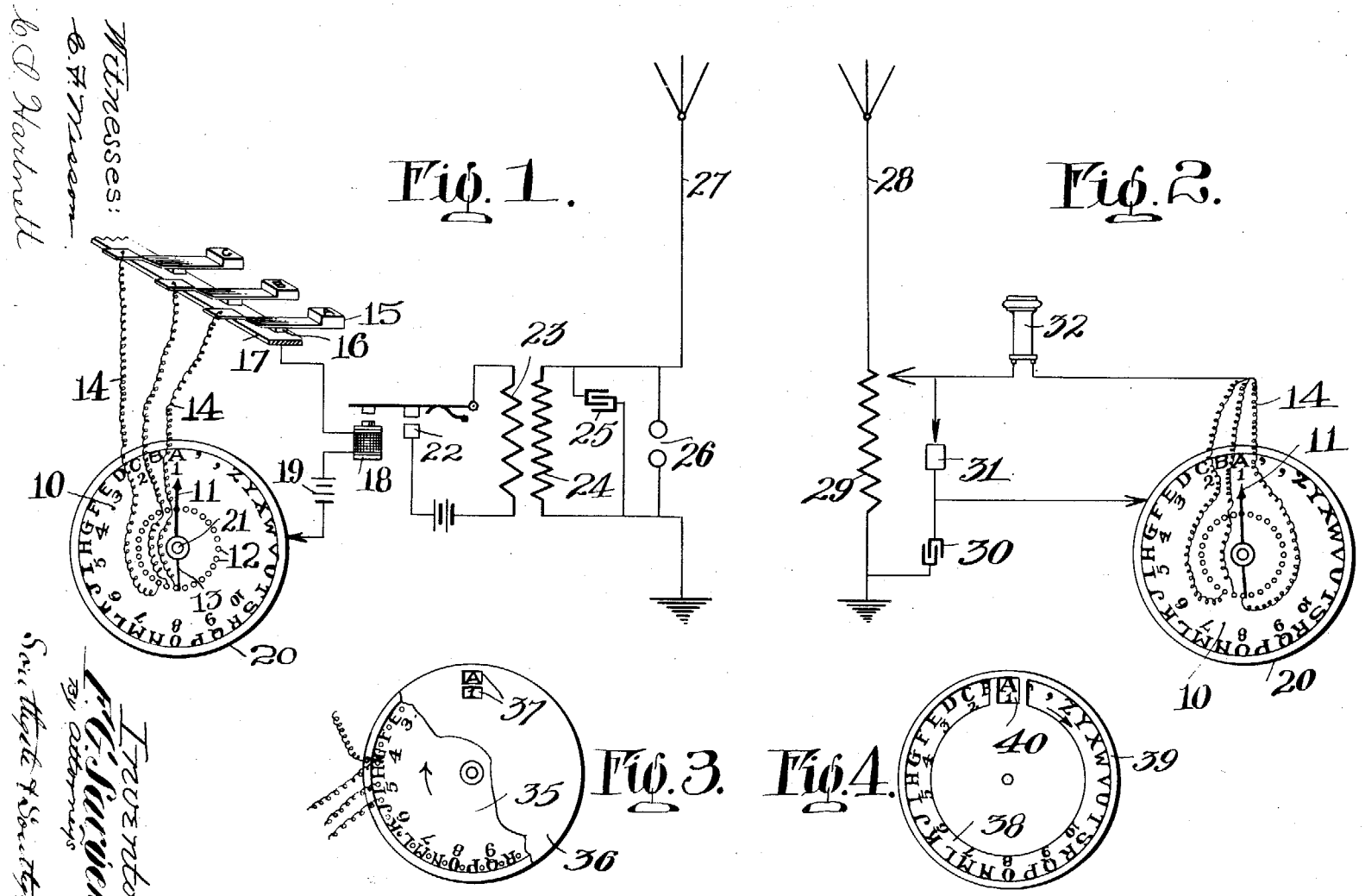
Witnesses:
C. F. Wesson
C. S. Hartnett
Inventor
F. G. Sargent
by Attorneys
Southgate & Southgate

UNITED STATES PATENT OFFICE.

FREDERICK G. SARGENT, OF WESTFORD, MASSACHUSETTS.

METHOD OF AND APPARATUS FOR SELECTIVE WIRELESS TELEGRAPHY.

14,012. Specification of Reissued Letters Patent. Reissued Nov. 16, 1915.

Original No. 1,091,768, dated March 31, 1914, Serial No. 731,279. Application for reissue filed October 29, 1914. Serial No. 869,327.

*To all whom it may concern:*

Be it known that I, FREDERICK G. SARGENT, a citizen of the United States, residing at Westford, county of Middlesex, and State of Massachusetts, have invented a new and useful Method of and Apparatus for Selective Wireless Telegraphy, of which the following is a specification.

This invention relates to a system of communicating or telegraphing, and for other purposes particularly adapted for use with wireless apparatus.

The principal objects of the invention are to secure secrecy and simplify both the sending and receiving operations. The invention also involves improvements in features of construction and combinations of parts as will appear hereinafter.

Reference is to be had to the accompanying drawings in which—

Figure 1 is a diagrammatic elevation of a sending station; Fig. 2 is a similar view of a receiving station adapted to coöperate therewith; Fig. 3 is a view of one of the dials showing a modification, and Fig. 4 is a similar view showing another modification.

Referring to Figs. 1 and 2 it will be seen that at each station there are two members one rotary and one stationary, namely a dial 10 and a pointer or indicator 11. For the purpose of this invention either the dial or the pointer may rotate and in the form shown in Figs. 1 and 2 the dial is intended to be stationary and the indicator to rotate. The means for rotating the rotatable member is not shown herein but any well known form of clock work or other rotating mechanism can be employed. It is intended to have the rotation at the several stations synchronous. For this purpose the instruments can be set or adjusted by the time signals sent out by the wireless stations every day or they can be provided with extremely accurate instruments so they will keep correct time with each other. At any rate, when commencing to operate, the stations can be adjusted to see if they are in unison by any simple means.

With the parts arranged as so far described, the apparatus can be used with any ordinary sending and receiving system, either wireless or otherwise. This mode of operation is as follows: The station wishing to talk calls the other station or stations in any usual way. After receiving the answer they can, if necessary, compare their dials to see that they are in unison and if not, adjust them so that they will be. The several dials, being provided with series of characters arranged in the same order thereon and rotating in the same direction, or the indicator rotating in the same direction as the case may be, the operators at the stations can give a pre-arranged signal, as for example "a" and if the signal is received at the stations when the indicators and dials are at that point it will be understood that all the instruments are in unison. The sending operator then sends signals by giving any predetermined signal, when the indicator 11 indicates the desired letter or character on his dial. The instruments being in unison and the signal being sent instantaneously the receiving station will get the signal when its indicator is showing the same letter or character. It will be understood of course that ordinarily the same signal will be sent each time so that to any station not having this apparatus the communications from the sending station would appear to be a repetition of the same signal but at unequal intervals. What I have described above is old. It is one purpose of this invention to provide for sending the signals automatically however. This system can be used also in actual connection with the wireless apparatus now in use and for this purpose the following connections are shown. On each of the dials 10 there are a series of contacting pins 12 corresponding in number with the characters on the dials, and the indicator 11 contacts with these periodically as it rotates. In Figs. 1 and 2 the indicator is shown as having a projection 13 for this purpose and the pin with which this projection is shown in contact in Fig. 1 would represent the character A or 1. From each of these pins 12 a conductor 14 is taken off which is connected with a push button 15 having a character thereon corresponding with the character which the indicator shows when that pin 12 is in contact with it. These push buttons 15 thus constitute a key board. Each one is provided with a contact 16 which engages a bar 17 when the key is depressed. This bar is connected with an electro-magnet 18 connected with a battery 19. This in turn is connected with the metallic case 20 in which the dial is located, which is electrically connected with the shaft 21 with which the metallic indicator 11 rotates. Consequently as the indicator rotates it periodically closes each of the several circuits one at a time, no two ever being closed at the same time. The pressing down of any one of the keys 15 of the key board closes that circuit at one point and then the circuit is completed whenever the indicator gets around to the position which indicates the same character. Then the magnet 18 is energized, a contact 22 is made, and a current is set up in the usual primary 23 and secondary 24. The circuit in which the secondary circuit 24 is located is provided with the usual condenser 25, oscillators 26, and aerial 27.

The receiving station is shown of a well known type having the aerial 28, coil 29, condenser 30, and detector 31. It is also provided with a telephone receiver 32 and this circuit is connected up with the dial at this station in a manner similar to that described at the other station, but there is no key board. One end of the circuit is connected with the case of the dial so that it is constantly connected with the indicator and the other end of the circuit is divided into as many lines as there are characters and one connected with each of the pins 12.

It will be understood of course that while I have described a complete sending station and a complete receiving station separate from each other, ordinarily each station will actually be provided with both the receiving and the sending mechanism. In this case the sending station is connected up for receiving purposes by simply switching out the battery 19 and connecting these wires to a telephone circuit located as at what I have called the receiving station. In either case the telephone circuit is closed only when the dial and indicator are in the same relative position as that in which they are in at the sending station. At other times nothing can be heard on the telephone receiver as its connections are broken. It will be understood, of course also that the telephone receiver can be dispensed with and a coherer used in the ordinary way for operating the relay. The relay then can operate lights or other apparatus for signals or other desired kind of communication or purposes. It will be understood, of course, also that the clock mechanism for operating the dials or indicator can be made to run only for a definite period of time if desired before requiring rewinding, or that the same can be made on the same principle as a stop watch so that it can be stopped and started as desired to save some of the rewinding. With a stop watch arrangement it can be arranged to start always on a definite character and then the device can be employed to place the several stations in unison. It will be understood of course that the clock work can be regulated so that the hand or dial can be made to revolve at any convenient speed, depending upon the size thereof and the distance apart of the characters.

In Fig. 3 another construction is shown in which the dial 35 rotates and is provided with a cover 36 having openings 37 therethrough constituting an indicator so that it will be simpler for the operator to tell which character is in the position for communication. The keys and contacts are used as in Fig. 1. In Fig. 4 another similar construction is shown in which there is a relative rotation between the dial 38 and the cover 39, a space 40 being provided for the purpose of designating the position of the letter called. This is merely a substitute for Fig. 3. Whether connected up as described or used simply as an automatic selective signaling device without the wireless telegraph connections, it is obvious that such an arrangement will prevent the reading of the messages by any party not having such a device and yet the operations of receiving and sending are simpler than they are with the types of wireless apparatus now in use.

Although I have illustrated and described only a few modifications of the invention, I am aware of the fact that other changes can be made therein by any person skilled in the art without departing from the scope of the invention as expressed in the claims. Therefore, I do not wish to be limited to all the details herein shown and described, but What I do claim is:—

1. The improvement in the art of sending messages, which consists in synchronously operating indicators relatively to similar dials at the sending and receiving stations respectively, making a series of electrical contacts in branches of a signaling circuit in regular order at the sending station during the entire relative successive operations of the sending dial and indicator, and completing a selected one of said branch circuits at another contact before the first named contact thereof is made in its turn so as to send a signal from the sending to the receiving station automatically at the instant that the indicator is located at a desired point on the dail at the sending station, whereby the operator at the receiving station can determine the signal to be sent by noting at that instant the relative position of the dial and indicator at his station.

2. The improvement in the art of wireless telegraphy, which consists in synchronously revolving indicators relatively to similar dials at the sending and receiving stations respectively, sending a signal by wireless means from the sending to the receiving station at the instant that the indicator is located at a desired point on the dial at the sending station, periodically closing a series of contacts in branches of a receiving circuit at the receiving station as the indicator revolves, whereby the operator at the receiving station can get no signal except when one of said contacts is closed but can determine the signal intended to be sent by noting the relative positions of his dial and indicator at that instant.

3. In a wireless telegraph apparatus, the combination of a set of dials and indicators therefor, one at each station, means for rotating said dials and indicators at each station relatively to each other, synchronously and continuously, each dial being provided with a series of characters arranged thereon in the same order, a series of contacts corresponding one with each character, circuits connected with said contacts, means for closing each circuit when the indicator of that dial indicates the character corresponding to the contact connected with that circuit, and wireless telegraph apparatus connected with said circuits.

4. In a wireless telegraph or signaling apparatus the combination of a set of dials and indicators, one at each station, means for relatively rotating the dail and indicator of each station synchronously with the rotation of those of the other station or stations, each dial being provided with a series of characters arranged thereon in the same order at the several stations and with a series of contacts corresponding with said characters, means for engaging said contacts in the same order at the several stations as the rotation is carried on, circuits connected with said contacts, a key-board at the sending station having keys, one connected with each of said circuits, each key corresponding with one of the characters on the dial, a wireless sending apparatus, and means whereby when any key is lowered a circuit to the sending apparatus will be completed with the exception of the making of the contact at the dial.

5. In a wireless telegraph or signaling apparatus, the combination of a set of dials and indicators, one at each station, means for relatively rotating the dial and indicator of each station synchronously with the rotation of those at the other station or stations, each dial being provided with a series of characters arranged thereon in the same order at the several stations and with a series of contacts corresponding with said characters, means for engaging said contacts in the same order at the several stations as the rotation is carried on, circuits connected with said contacts, a key-board at the sending station having keys, one connected with each of said circuits, each key corresponding with one of the characters on the dial, a wireless sending apparatus, means whereby when any key is lowered a circuit to the sending apparatus will be completed with the exception of the making of the contact at the dial, a corresponding number of partial circuits at the receiving station each adapted to be closed by the relative rotation of the dial and indicator in the same order as at the sending station, and means in series with all of said partial circuits at the receiving station for detecting the sending of a signal.

6. In a wireless telegraph or signaling apparatus, the combination of a set of dials and indicators, one at each station, means for relatively rotating the dial and indicator of each station synchronously with the rotation of those of the other station or stations, each dial being provided with a series of characters arranged thereon in the same order at the several stations and with a series of contacts corresponding with said characters, means for engaging said contacts in the same order at the several stations as the rotation is carried on, circuits connected with said contacts, and a key-board at the sending station having keys, one connected with each of said circuits.

7. In a wireless telegraph or signaling apparatus, the combination of a set of relatively rotatable dials and indicators at each station, each dial being provided with a series of contacts arranged thereon in the same way at the several stations, means for engaging said contacts in the same order at the several stations as the rotation is carried on, circuits connected with said contacts, a key-board at the sending station having keys, one connected with each of said circuits, each key corresponding with one of the contacts of the dial, a wireless sending apparatus, means whereby when any key is lowered the circuit to the sending apparatus will be complete with the exception of the making of the contact at the dial, a corresponding number of branch circuits at the receiving station, each adapted to be closed in the same order as at the sending station, and means in series with all of said branch circuits, at the receiving station for detecting the signal.

8. In a wireless telegraph or signaling apparatus, the combination of a set of relatively rotatable dials and indicators at each station, each dial being provided with a series of contacts arranged in the same order at the several stations, means for engaging said contacts in the same order at the several stations as the rotation is carried on, circuits connected with said contacts, a key-board at the sending station having keys, one connected with each of said circuits, each key corresponding with one of the contacts on the dials, a wireless sending apparatus, and means whereby when any key is lowered a circuit will be completed with the exception of the making of the contact at the dial.

9. In a wireless telegraph or signaling apparatus, the combination of a set of relatively rotatable dials and indicators at each station, each dial being provided with a series of contacts, means for engaging said contacts in the same order at the several stations as the rotation is carried on, circuits connected with said contacts, and a keyboard at the sending station having keys, one connected with each of said circuits.

10. In an apparatus of the class described, the combination of a set of relatively rotatable dials and indicators at each station, each dial being provided with a series of contacts arranged thereon in the same order, branch circuits connected with said contacts, means for closing each branch circuit when the indicator of that dial registers with the contact corresponding, and signaling means connected with said circuits and adapted to be operated thereby.

11. In an apparatus of the class described, the combination of a set of relatively rotatable dials and indicators provided with a series of contacts arranged in order, branch circuits connected with said contacts at the receiving station, means for closing each branch circuit in regular order during the relative rotation of the indicator and dial, and receiving means connected with all of said branch circuits and adapted to be rendered operative only when a contact of the dial and a contact of the indicator at the receiving station are in contact, whereby the operator at the receiving station can determine the signal intended to be sent by noting the relative positions of his dial and indicator at the instant that he receives the signal.

12. In an apparatus of the class described, the combination of a relatively rotatable dial and indicator at the sending station, the dial being provided with a series of contacts, means for engaging said contacts in order as the rotation is carried on, branch circuits connected with said contacts, a key board having keys, one connected with each of said branch circuits and each adapted to close its branch circuit at that point when the keys operate, whereby each branch circuit can be completely closed only by the operation of its key and the contact of the corresponding pair of contacts.

13. In a wireless telegraph or signaling apparatus, the combination of a set of relatively rotatable dials and indicators at each station, each dial being provided with a series of contacts arranged thereon in the same order, means for engaging said contacts in the same order at the sending and receiving stations as the rotation is carried on, branch circuits connected with the several contacts, a key board at the sending station having keys, one connected with each of the branch circuits at that station and adapted to close and open the branch circuits at one point of each, and receiving means connected with the branch circuits of the receiving station and adapted to be rendered operative only when a contact of the dial and a contact of the indicator at the receiving station are in contact, whereby the operator at the receiving station can determine the signal intended to be sent by noting the relative position of the dial and indicator at his station when he receives a signal.

14. An improvement in the art of sending and receiving messages which consists in synchronously operating indicators relatively to similar dials at the sending and receiving stations respectively, making a series of electrical contacts in branches of a signaling circuit in regular order at the sending station during the relative operation of the sending dial and indicator and completing one of said branch circuits so as to send a signal from the sending station automatically at the instant that the indicator is located at a desired point on the dial at the sending station, periodically closing a series of contacts in branches of a receiving circuit at the receiving station as the indicator at that station moves, whereby the operator at the receiving station can get no signal except when one of said pairs of contacts at his station is closed but can determine the signal intended to be sent by noting the relative positions of his dial and indicator at that instant.

In testimony whereof I have hereunto set my hand in the presence of two subscribing witnesses.

FREDERICK G. SARGENT.

Witnesses:

CHAS. G. SARGENT,

FRED W. SWAIN.